(12) United States Patent
Kalamatianos et al.

(10) Patent No.: US 9,021,207 B2
(45) Date of Patent: Apr. 28, 2015

(54) MANAGEMENT OF CACHE SIZE

(71) Applicant: Advanced Micro Devices, Inc., Sunnyvale, CA (US)

(72) Inventors: John Kalamatianos, Arlington, MA (US); Edward J. McLellan, Holliston, MA (US); Paul Keltcher, Lexington, MA (US); Srilatha Manne, Portland, OR (US); Richard E. Klass, Fort Collins, CO (US); James M. O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 223 days.

(21) Appl. No.: 13/723,093

(22) Filed: Dec. 20, 2012

(65) Prior Publication Data
US 2014/0181410 A1    Jun. 26, 2014

(51) Int. Cl.
*G06F 12/12*  (2006.01)

(52) U.S. Cl.
CPC ........... *G06F 12/121* (2013.01); *Y02B 60/1225* (2013.01)

(58) Field of Classification Search
USPC ................. 711/133, 130, 154, 156; 713/320; 365/227; 714/39, 815
See application file for complete search history.

(56) References Cited

U.S. PATENT DOCUMENTS

| | | | |
|---|---|---|---|
| 6,081,853 A * | 6/2000 | Gaskins et al. | 710/35 |
| 6,385,696 B1 * | 5/2002 | Doweck | 711/128 |
| 6,973,538 B2 * | 12/2005 | Khawand et al. | 711/130 |
| 7,437,513 B2 * | 10/2008 | Saida et al. | 711/128 |
| 7,647,514 B2 * | 1/2010 | Ishihara et al. | 713/320 |
| 7,822,926 B2 * | 10/2010 | Croxford et al. | 711/129 |
| 8,281,169 B2 * | 10/2012 | Borras et al. | 713/322 |
| 8,335,122 B2 * | 12/2012 | Dreslinski et al. | 365/226 |
| 8,522,004 B2 * | 8/2013 | Borras et al. | 713/2 |
| 2004/0199725 A1 * | 10/2004 | Khawand et al. | 711/130 |
| 2005/0246499 A1 * | 11/2005 | Saida et al. | 711/128 |
| 2008/0244181 A1 * | 10/2008 | Walz et al. | 711/121 |
| 2008/0256303 A1 * | 10/2008 | Croxford et al. | 711/144 |
| 2009/0327609 A1 * | 12/2009 | Fleming et al. | 711/118 |
| 2010/0057983 A1 * | 3/2010 | Borras et al. | 711/105 |
| 2012/0173907 A1 * | 7/2012 | Moses et al. | 713/321 |
| 2013/0304991 A1 * | 11/2013 | Bottcher et al. | 711/122 |
| 2014/0095691 A1 * | 4/2014 | Ganguli et al. | 709/224 |

* cited by examiner

*Primary Examiner* — Stephen Elmore (57) ABSTRACT

In response to a processor core exiting a low-power state, a cache is set to a minimum size so that fewer than all of the cache's entries are available to store data, thus reducing the cache's power consumption. Over time, the size of the cache can be increased to account for heightened processor activity, thus ensuring that processing efficiency is not significantly impacted by a reduced cache size. In some embodiments, the cache size is increased based on a measured processor performance metric, such as an eviction rate of the cache. In some embodiments, the cache size is increased at regular intervals until a maximum size is reached.

19 Claims, 7 Drawing Sheets

MANAGEMENT OF CACHE SIZE

FIELD OF THE DISCLOSURE

The present disclosure relates generally to processors and more particularly to processor caches.

BACKGROUND

A multicore processor typically employs a memory hierarchy including multiple caches to store data for the processor cores. In some configurations, the memory hierarchy includes a dedicated cache for each processor core, one or more shared caches, and system memory. Each processor core stores data predicted to be accessed soon at its dedicated cache, data predicted to be accessed somewhat later at the one or more shared caches, and data that is not predicted to be accessed (or predicted to be accessed much later) at the system memory. To enhance processor efficiency, the one or more shared caches are typically designed to have a relatively large capacity as compared to the dedicated caches. In addition, to reduce access latency to the memory hierarchy, the one or more shared caches are typically operated with a relatively high voltage as compared to the system memory. The one or more shared caches can therefore contribute significantly to the power consumption of the processor.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-9 illustrate example techniques for managing the size of a cache to reduce power consumption at a processor. In response to a processor core exiting a low-power state, the cache is set to a minimum size so that fewer than all of the cache's entries are available to store data, thus reducing the cache's power consumption. Over time, the size of the cache can be increased to account for heightened processor activity, thus ensuring that processing efficiency is not significantly impacted by a reduced cache size. In some embodiments, the cache size is increased based on a measured processor performance metric, such as an eviction rate of the cache. In some embodiments, the cache size is increased at regular intervals until a maximum size is reached.

Figure 1:
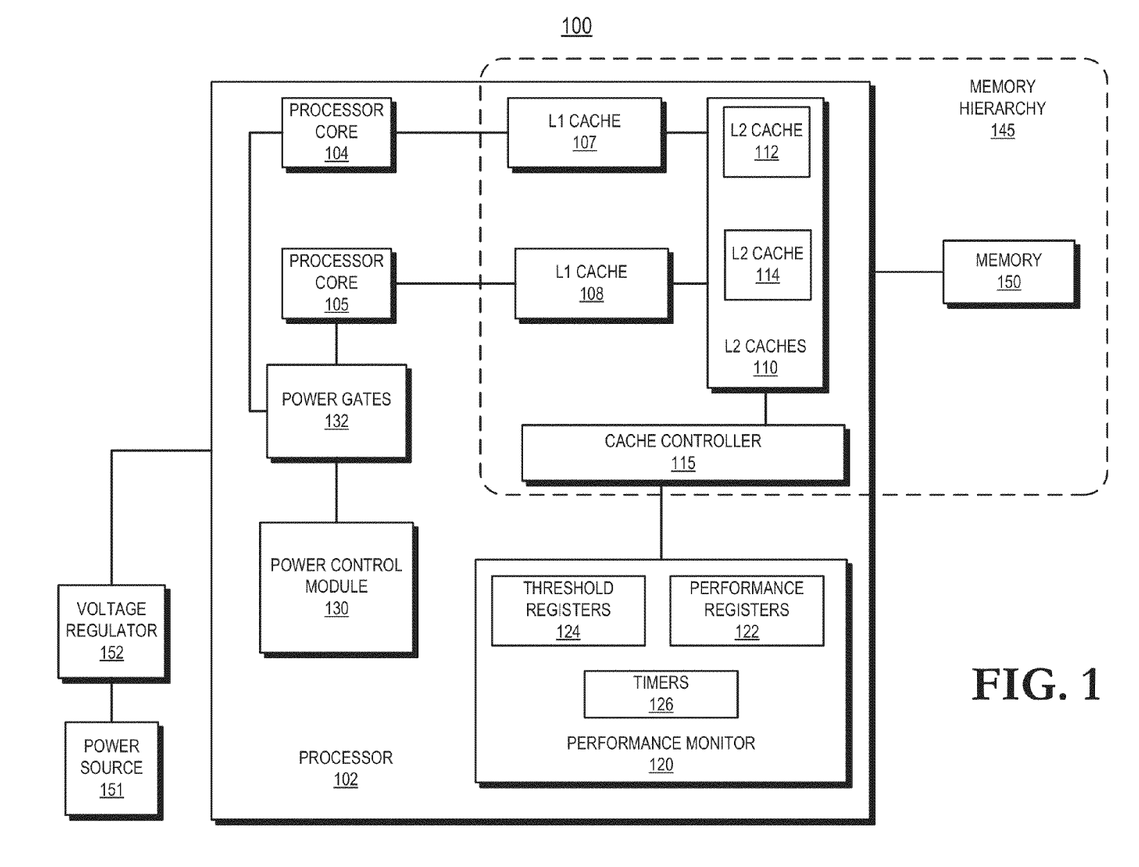
FIG. 1 is a block diagram of a processing system having a cache with an adjustable size in accordance with some embodiments.

FIG. 1 illustrates a processing system 100 having a cache with an adjustable size in accordance with some embodiments. The processing system 100 can be used in any of a variety of electronic devices, such as a personal computer, server, portable electronic device such as a cellular phone or smartphone, a game system, set-top box, and the like. The processing system 100 generally stores and executes instructions organized as computer programs in order to carry out tasks defined by the computer programs, such as data processing, communication with other electronic devices via a network, multimedia playback and recording, execution of computer applications, and the like.

The processing system 100 includes a processor 102, a memory 150, a power source 151, and a voltage regulator 152. The power source 151 can be any source that can provide electrical power, such as a battery, fuel cell, alternating current source (e.g. an electrical outlet or electrical generator), and the like. In some embodiments the power source 151 also includes modules to regulate the form of the provided electrical power, such as modules to convert an alternating current to direct current. In either scenario, the power source 151 provides the electrical power via an output voltage. The voltage regulator 152 regulates the output voltage to provide a power supply voltage that it maintains with specified limits. The power supply voltage provides power to the processor 102, and can also provide power to other components of the processing system 100, such as the memory 150.

The memory 150 includes one or more storage devices that manipulate electrical energy in order to store and retrieve data. Accordingly, the memory 150 can be random access memory (RAM), hard disk drives, flash memory, and the like, or any combination thereof. The memory 150 is generally configured both to store the instructions to be executed by the processor 102 in the form of computer programs and to store the data that is manipulated by the executing instructions.

To facilitate the execution of instructions, the processor 102 includes multiple processor cores (e.g. processor cores 104 and 105). Each processor core includes one or more instruction pipelines to fetch, decode, dispatch, execute, and retire instructions. An operating system (OS) executing at the processor 102 assigns the particular instructions to be executed to each processor core. To illustrate, a particular sequence of instructions to be executed by a processor core is referred to as a program thread. A thread can represent either an entire a computer program or a portion thereof assigned to carry out a particular task. For a computer program to be executed, the OS identifies the program threads of the computer program and assigns (schedules) the threads for execution at the processor cores 104 and 105. To enhance processing efficiency, the processor cores 104 and 105 are configured to execute their assigned program threads (either from the same computer program or different computer programs) in parallel.

In some situations, there will be more threads to be executed than there are processor cores to execute them. In these scenarios, the OS selects and schedules the threads to be executed based on a defined prioritization scheme. The changing of the particular thread assigned to a given processor core is referred to as a context switch. The OS enhances processing efficiency by performing context switches in response to defined system conditions, such as a given executing thread awaiting data from the memory 150.

In some scenarios, there will be fewer program threads scheduled for execution at the processing system 100 than there are processor cores needed to execute the program threads. Accordingly, to conserve power, the processing system 100 includes a power control module 130 and power gates 132 that together control the power supplied individually to the processor cores 104 and 105. In some embodiments, the power gates 132 includes a set of switches that are controlled by the power control module 130 to selectively couple and decouple the voltage supplied by the voltage regulator 152 to the processor cores 104 and 105. In response to receiving an indication from the OS that a processor core is not scheduled to execute a program thread, the power control module 130 sets the state of the power gates 132 so that power is not supplied (or a reduced amount of power is supplied) to that processor core. This is referred to as "power gating" the processor core. While a processor core is power gated, it may retain some state information, but cannot execute a program thread. In response to receiving an indication from the OS that a program thread has been scheduled for execution at a processor core that is power gated, the power control module 130 sets the state of the power gates 132 so that power is again supplied (or an increased amount of power is supplied) to that processor core. The processor core is thereby placed in an operational state wherein it can execute the instructions of one or more program threads.

In the course of executing instructions, each of the processor cores 104 and 105 stores and retrieves data from a memory hierarchy 145 that includes the memory 150 and a set of caches including level 1 (L1) caches 107 and 108 and level 2 (L2 caches) 110, including L2 cache 112 and L2 cache 114. The level of a cache indicates its position in the memory hierarchy 145, with L1 caches representing the highest level, L2 caches the next-lower level, and the memory 150 representing the lowest level. In the illustrated example, each of the L1 caches 107 and 108 is dedicated to a corresponding processor core (processor cores 104 and 105 respectively), such that each L1 cache only responds to load and store operations from the processor core to which it is dedicated. In contrast, the L2 caches 110 are shared between the processor cores 104 and 105, such that the L2 caches 110 can store and retrieve data on behalf of either processor core. In some embodiments, the L2 caches are assigned to particular executing threads, such that an L2 cache only stores data for the threads to which it is assigned.

The memory hierarchy 145 is configured to store data in a hierarchical fashion, such that the lowest level (the memory 150) stores all system data, and other levels store a subset of the system data. The processor cores 104 and 105 access (read or write) data in the memory hierarchy 145 via memory access operations, whereby each memory access operation indicates a memory address of the data to be accessed. In the event that a particular level of the memory hierarchy does not store data associated with the memory address of a received memory access, it requests the data from the next-lower level of the memory hierarchy. In this fashion, data traverses the memory hierarchy, such that the L1 caches 107 and 108 store the data most recently requested by the processor cores 104 and 105 respectively.

As used herein, the size of a cache refers to the number of entries of the cache that can be employed to respond to memory access operations. The L1 caches 107 and 108 and the L2 caches 110 are limited in size such that, in some scenarios, they cannot store all the data that is the subject of memory access operations from the processor cores 104 and 105. Accordingly, the memory hierarchy 145 includes a cache controller to manage the data stored at each cache. To illustrate, in some embodiments the L1 caches 107 and 108 and the L2 caches 110 are configured as set-associative caches whereby each cache includes a defined number of sets with each set including a defined number of entries, referred to as ways. The cache controller 115 assigns each set of a cache to a particular range of memory addresses, such that each way of a set can only store data for memory addresses in its range. In response to receiving a memory access operation for a particular cache, the cache controller 115 determines which set includes the memory address of the memory access operation in its assigned range. The cache controller 115 then determines whether one of the ways of the set stores data associated with the memory address and, if so, satisfies the memory access operation. If none of the ways of the set stores data associated with the memory address, the cache controller 115 determines whether there is an available way to store the data associated with the memory address. A way is available to store the data if it does not store valid data associated with another memory address in the set's memory address range. If there is an available way, the cache controller 115 assigns the available way to the memory address and satisfies the memory access operation, either (in the case of a store operation) by storing data associated with the memory access operation or (in the case of a load operation) by retrieving data associated with the memory address from lower levels in the memory hierarchy 145, storing it at the selected way, and providing the retrieved data to the requester.

If the cache controller 115 determines there is not an available way for a given memory access operation, it selects one of the ways of the set for replacement based on a defined replacement algorithm, such as a least-recently-used (LRU) algorithm, most-recently used (MRU) algorithm, random replacement algorithm, and the like. The cache controller 115 evicts the selected way by transferring the data stored at the selected way to the next-lower level of the memory hierarchy 145, and then satisfies the memory access operation at the selected way.

For the L2 caches 110, the cache controller 115 can adjust the size of the caches based on defined conditions as described further herein. In some embodiments, the cache controller 115 adjusts the size of a given L2 cache by changing the number of ways assigned to each set of the cache. To illustrate, L2 cache 112 can have a sufficient number of bit cells to implement an M-way set associative cache. However, the cache controller 115 can limit the number of ways assigned to each set to N ways, where N is less than M, as described further below. Because the use of each way in a set consumes power, limiting the size of an L2 cache can reduce power consumption at the processor 102, at the cost of a potentially higher cache eviction rate and reduced processing efficiency. To ensure that the size limit placed on an L2 cache does not unduly impact processing efficiency, the cache controller 115 can adjust the sizes of the L2 caches 110 over time. To illustrate, the processor 102 includes a performance monitor 120 to monitor performance metrics for the processor 102. The performance monitor 120 includes performance registers 122 to store performance data such as the number of instructions retired at each of the processor cores 104 and 105, the number of times particular core registers are accessed, the number of evictions at each level of the memory hierarchy 145, and the like. The performance monitor 120 also includes a set of timers 126 that measure time elapsed from a reset point associated with each timer. In addition, the performance monitor 120 includes a set of programmable threshold registers 124 to store threshold values for the performance data stored at the performance registers 122. Using the performance registers 122, the timers 126, and the threshold registers 124, the performance monitor 120 provides performance metrics for the processor 102, such as the rate at which data is evicted from the L2 caches 110 and whether that rate exceeds a corresponding threshold. Based on this information, the cache controller 115 can adjust the size of the L2 caches 110 to ensure that processing performance is not unduly impacted.

In some embodiments, the performance metric used by the cache controller 115 to adjust the size of one or more of the L2 caches is the rate at which data is evicted from the L2 cache, referred to as the cache eviction rate (CER). The cache controller 115 measures the CER by reading one of the performance registers 122 that measures the number of micro-operations committed at the corresponding processor core and reading another of the performance registers 122 that measures the number of evictions at the corresponding L2 cache. In particular, CER is given by the following formula:

$$CER = \frac{\text{Evictions}}{\text{\# of comitted micro-operations}}$$

In some embodiments, the frequency of a processor core entering and exiting the low-power state indicates an expected level of activity for the processor core. For example, if a processor core is frequently exiting the low power state, it indicates a fairly high level of activity that can benefit from a larger cache size. Accordingly, in some embodiments one of the performance registers 122 measures the frequency with which the processor core 105 enters or exits the low power state. The cache controller 115 adjusts the size of one or more of the L2 caches 110 based on this metric.

Figure 2:
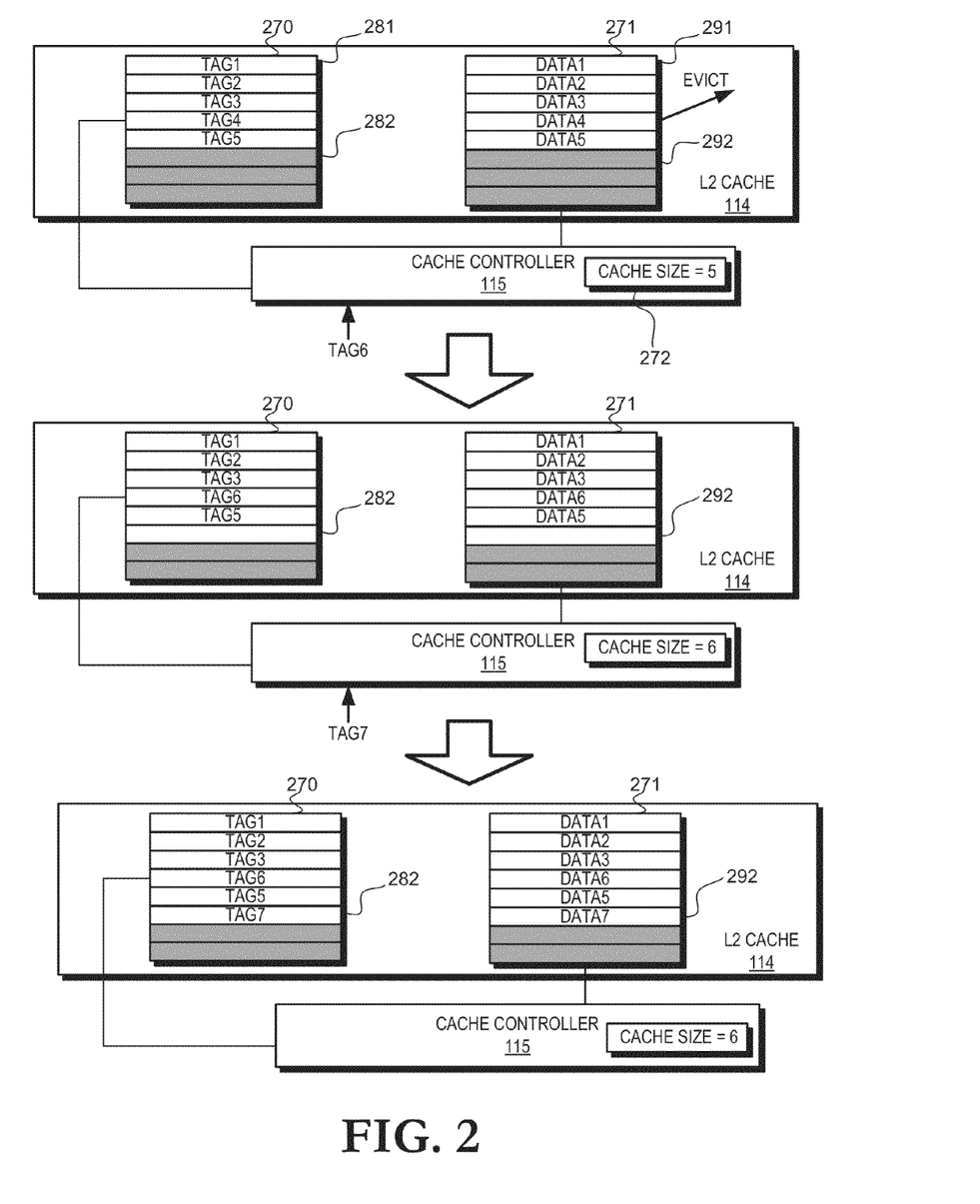
FIG. 2 is a diagram illustrating the changing the size of an L2 cache of the processing system of FIG. 1 in accordance with some embodiments.

FIG. 2 illustrates an example of the changing of the cache size for the L2 cache 114 based on the CER in accordance with some embodiments. In the illustrated example, the L2 cache 114 includes a tag array 270 and a set 271. For clarity of illustration, the other sets of the L2 cache 114 are not depicted, but when the L2 cache 114 is increased in size, each set is increased as described below with respect to set 271.

In the illustrated example, the set 271 includes a number of ways, such as ways 291 and 292, whereby each way is a set of bit cells that can store data. The storage and retrieval of data from a way requires the switching and maintenance of the bit cells' transistors to defined states, thereby consuming power. Accordingly, the amount of power consumed by the L2 cache 114 depends in part upon the number of ways used to store data. Accordingly, by limiting the number of ways of the L2 cache 114 that store data, the cache controller 115 reduces the power consumption of the L2 cache 114 at the potential cost of an increased cache eviction rate and commensurate reduced processing efficiency.

The tag array 270 includes a number of entries, such as entries 281 and 281, with each entry able to store a tag indicating the memory address of the data stored at a corresponding way of the sets of the L2 cache 114. For a memory access operation, a processor core supplies to the cache controller 115 a tag indicating the memory address associated with the memory access operation. The cache controller 115 supplies the received tag to the tag array 270, which provides an indication as to whether it stores the supplied tag. If the tag array 270 does store the tag, it indicates a cache hit and in response the cache controller 115 uses the memory address of the memory access operation to access the way that stores the data associated with the memory address.

If the tag array 270 does not store the tag, it indicates a cache miss and the cache controller 115 retrieves the data associated with the memory address from the memory 150. In response to receiving the data, the cache controller 115 determines if there is an available way to store the data and, if so, stores the data at the available way. In addition, the cache controller 115 stores the tag for the memory address of the data at the tag array 270. If there is not an available way, the cache controller 115 selects a way for eviction based on an eviction policy (e.g. an LRU policy) and evicts the data from the selected way by storing the retrieved data at the selected way. In addition, the cache controller 115 replaces the tag for the evicted data with the tag for the retrieved data.

In some embodiments, the cache controller 115 sets the size of the L2 cache 114 by setting the number of entries of the tag array 270 that are used, and the number of ways of the set 271 (and for each other set of the L2 cache 114). To illustrate, in the depicted example the cache controller 115 includes a cache size register 272 that stores a size value indicating the size of the L2 cache 114. The size value governs the number of entries the cache controller uses at the tag array 270 and the number of ways of each set of the L2 cache 114 that are used to store data. In FIG. 2, tag array entries and ways that are available for use are illustrated with a white background and tag array entries and ways that are not available for use are illustrated with a gray background. Accordingly, in the illustrated example the tag array entry 282 and the way 292 are initially unavailable for use.

In the example of FIG. 2, the cache controller 115 initially sets the size of the L2 cache 114 to five, such that there are five entries available at the tag array 270 for set 271, and five corresponding ways of set 271. In response to receiving a sixth tag (designated "TAG6") associated with a memory access, the cache controller 115 supplies TAG6 to the tag array 270, which indicates a cache miss. In response, the cache controller 115 retrieves the data (designated "DATA6") associated with the memory address of the memory access. In addition, the cache controller 115 determines that the set 271 stores five valid data entries, which is the maximum allowed as indicated by the cache size register 272. In response, the cache controller 115 selects a way of set 271 for eviction and evicts the data by storing DATA6 at the selected way and storing TAG6 at the corresponding entry of the tag array 270.

In addition, in the example of FIG. 2 the eviction of the selected way causes the CER to exceed its programmable threshold. In response, the cache controller 115 increases the value at the cache size register 272 to six. This causes way 292 and the corresponding tag array entry, to become available to respectively store data and a corresponding tag. Accordingly, in response to receiving a seventh tag (designated "TAG7") associated with a memory access the cache controller 115 supplies TAG6 to the tag array 270, which indicates a cache miss. In response, the cache controller 115 retrieves the data (designated "DATA7") associated with the memory address of the memory access. In addition, the cache controller 115 determines that the set 271 stores five valid data entries, which is less than the maximum number indicated by value stored at the cache size register 272. Accordingly, the cache controller 115 stores DATA7 at the available way 292 and the corresponding tag at entry 282. Thus, way 292 is not used until the CER exceeds its programmable threshold, conserving power until activity at the processing cores 104 and 105, as indicated by the CER, is such that processing efficiency is likely to be unduly impacted.

In some embodiments, the cache controller 115 can determine whether to adjust the size of an L2 cache based on other performance metrics. For example, in some embodiments the performance monitor 120 keeps track of the number of times each of the processor cores 104 and 105 are power gated, and therefore keep track of the number of times each of the processor cores 104 and 105 enter and exit the low-power state. Based on this information, the cache controller 115 can determine whether to place one of the L2 caches 110 in an adjustable state, such that the cache is adjusted based on a performance metric. To illustrate, in some embodiments, the cache controller 115 determines, based on information stored at the performance monitor 120, whether the frequency of processor core 104 entering and exiting the low-power state exceeds a threshold. If the frequency does not exceed the threshold, in response to the processor core 104 exiting the low-power state the cache controller 115 sets the size of the L2 cache 112 to its minimum size and adjusts the size of the cache based on its CER, as described above. If the frequency of the processor core 104 entering and exiting low power state exceeds the threshold, in response to the processor core 104 exiting the low-power state the cache controller 115 sets the size of the L2 cache 112 to its maximum size and does not adjust the size over time. This ensures that, during relatively active periods such that a processor core is frequently entering and exiting the low-power mode, the L2 caches 110 are sized to increase processing efficiency.

Figure 3:
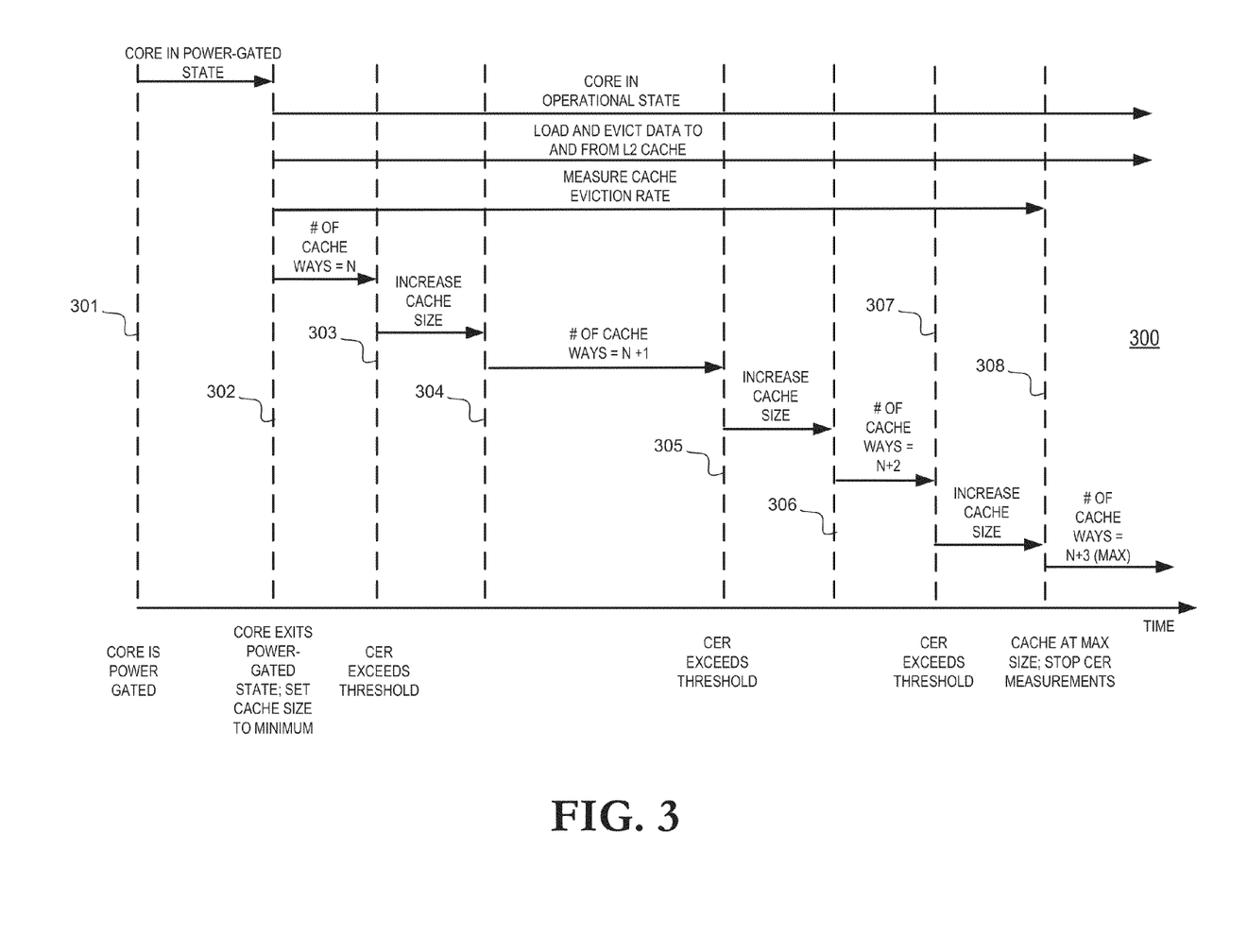
FIG. 3 is a timeline illustrating adjustment of a size of a shared cache of FIG. 1 based on a performance metric in accordance with some embodiments.

FIG. 3 illustrates a timeline 300 showing an example of the cache controller 115 adjusting the size of an L2 cache in accordance with some embodiments. For purposes of illustration, FIG. 3 is described with respect to adjustment of the size of L2 cache 114. At time 301 the power control module 130 power gates the processor core 105 to place it in a low power state. Accordingly, between time 301 and 302 the L2 cache 114 is not used. At time 302, in response to defined system conditions (e.g. additional program threads being scheduled for execution) the power control module 130 resumes provision of power to the processor core 105, which exits the low-power state. Accordingly, beginning at time 302 the processor core 105 is in an operational state where it executes instructions, and therefore data is stored and retrieved from the L2 cache 111. In addition, in response to the processor core 105 exiting the low-power state, the cache controller 115 sets the size of the L2 cache 114 to a defined minimum size N, where N indicates the number of ways assigned to each set in the cache.

At time 303, the cache controller 115 determines that the CER exceeds a programmable threshold stored at one of the threshold registers 124. This indicates that the program thread executing at the processor core 105 is experiencing a high level of memory access activity, such that a limited L2 cache size may adversely impact processing efficiency. Accordingly, at time 304 the cache controller 115 increases the size of the L2 cache 114 to N+1, such that each set of the cache includes N+1 ways.

At time 305, the cache controller 115 determines that the CER again exceeds the programmable threshold. Accordingly, at time 306 the cache controller 115 increases the size of the L2 cache 114 to N+2. Because the L2 cache 114 is not yet at its maximum size, the cache controller 115 continues to measure the CER. At time 307, cache controller 115 determines that the CER once again exceeds the threshold and therefore increases the size of the L2 cache 114 to N+3 at time 308. In addition, the cache controller 115 determines based on, for example, a stored configuration value that N+3 is the maximum possible size for the L2 cache 114. Accordingly, at time 308 the cache controller 115 stops measuring the CER for the L2 cache 114, ensuring that the cache size will not be increased further.

Figure 4:
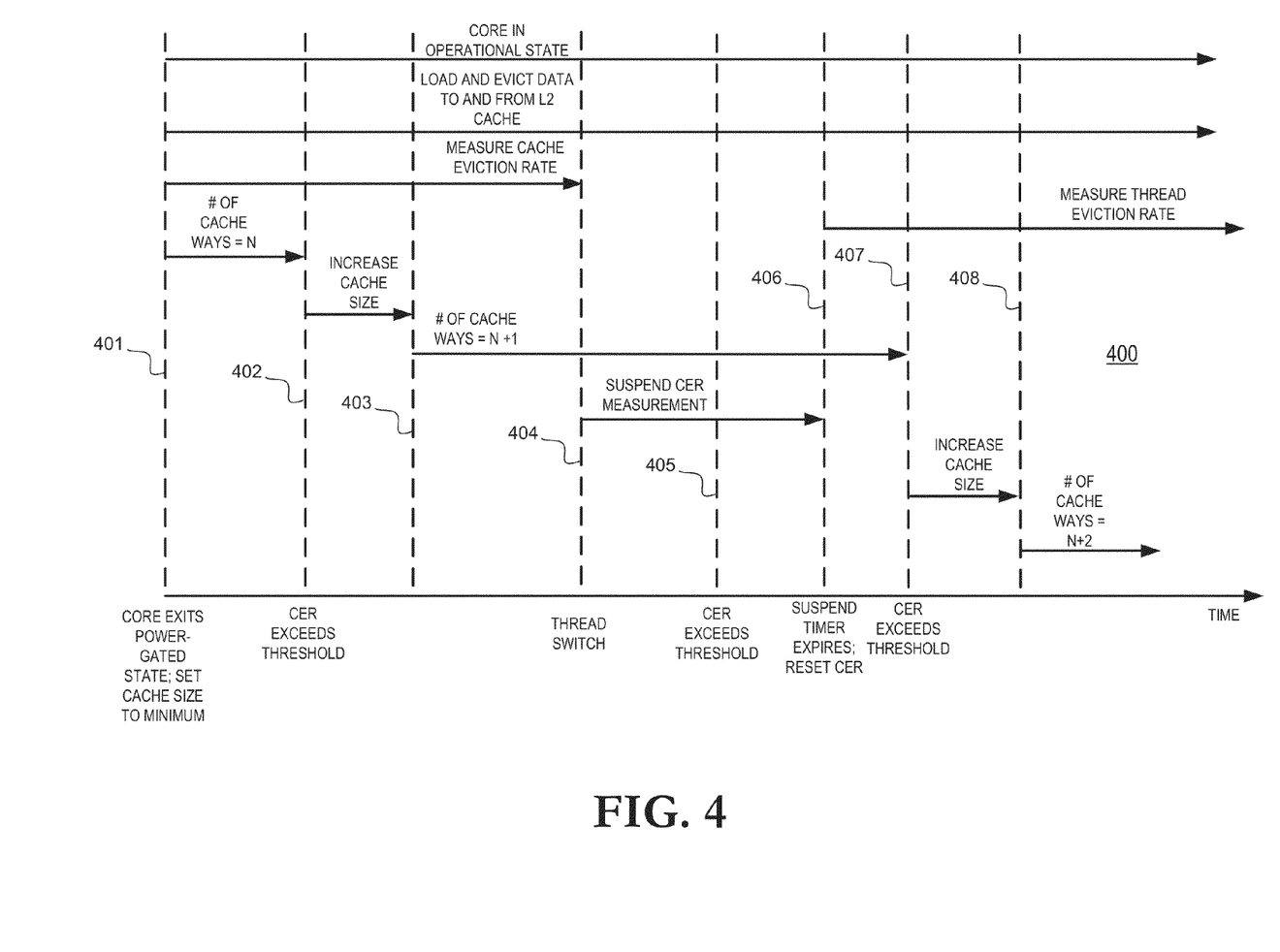
FIG. 4 is a timeline illustrating adjustment of the size of the shared cache of FIG. 1 based on a context switch in accordance with some embodiments.

In some embodiments, a context switch at a processor core can cause a temporary increase in the CER for an L2 cache as the new thread requests its data to be loaded into the higher levels of the memory hierarchy 145. However, once the data has been loaded, the amount of memory access activity experienced by the thread may be relatively low. Accordingly, the context switch can cause the L2 cache size to be increased, at the cost of increased power consumption, without a commensurate benefit in processing activity. The cache controller 115 can therefore be configured to suspend measurement of the CER in response to a context switch to ensure that the L2 cache size is not enlarged unnecessarily. An example of this operation is shown at FIG. 4, which illustrates a timeline 400 in accordance with some embodiments.

At time 401, the power control module 130 resumes provision of power to the processor core 105, which in response exits the low-power state and enters the operational state to execute an assigned program thread. In response to the processor core 105 exiting the low-power state, the cache controller 115 sets the size of the L2 cache 114 to the defined minimum size N, where N indicates the number of ways assigned to each set in the cache. The cache controller 115 also begins measuring the rate at which data is evicted from the L2 cache 114.

At time 402, the cache controller 115 determines that the CER exceeds the programmable threshold stored at one of the threshold registers 124. Accordingly, at time 403 the cache controller 115 increases the size of the L2 cache 114 to N+1. At time 404 the processor core 105 undergoes a context switch and begins executing a different program thread. Accordingly, the cache controller 115 suspends measuring the CER and initiates one of the timers 126 to measure the amount of time measurement has been suspended. At time 405 the CER again exceeds the programmable threshold as the program thread being executed experiences a large number of memory accesses as its data is loaded into the higher levels of the memory hierarchy 145. However, because the cache controller 115 has suspended measurement of the CER, the size of the L2 cache 114 is not increased.

At time 406, the timer measuring the length of time that CER measurement has been suspended reaches a threshold (expires). Accordingly, the cache controller 115 resets any previously stored value for CER and resumes measurement of the CER for the L2 cache 114. At time 407 the CER exceeds the programmable threshold. In response, at time 408 the cache controller 115 increases the size of the L2 cache 114 to N+2.

Figure 5:
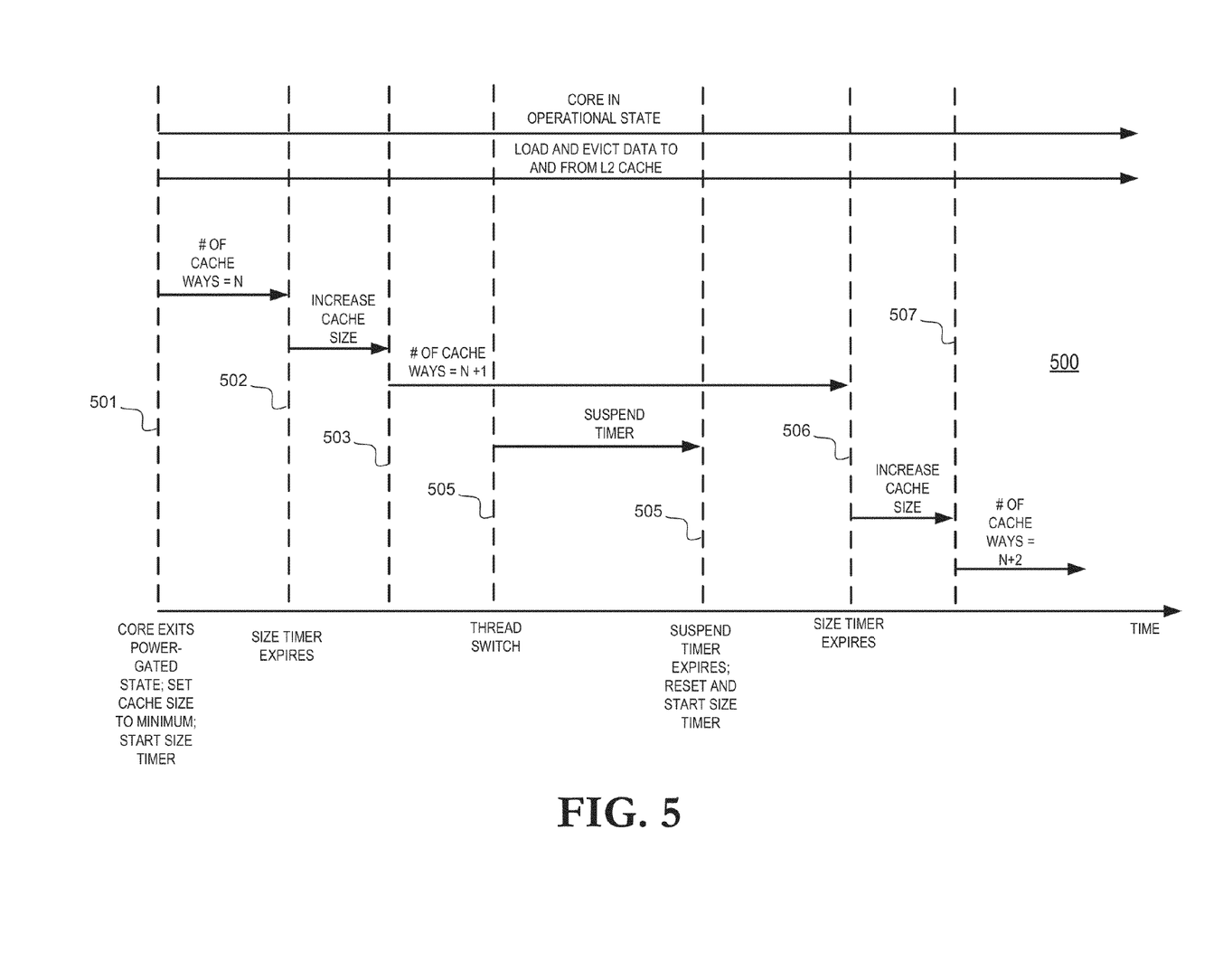
FIG. 5 is a timeline illustrating adjustment of the size of the shared cache of FIG. 1 based on time intervals in accordance with some embodiments.

In some embodiments, the cache controller 115 does not increase the size of the L2 caches 110 based on particular performance metrics, but rather based on the expiration of a programmable amount of time. This reduces the amount of overhead at the cache controller 115 and accounts for the likelihood that a program thread's memory access activity increases over time. An example of this operation is illustrated at FIG. 5, which depicts a timeline 500 in accordance with some embodiments. At time 501 the power control module 130 resumes provision of power to the processor core 105, which in response exits the low-power state and enters the operational state to execute an assigned program thread. In response to the processor core 105 exiting the low-power state, the cache controller 115 sets the size of the L2 cache 114 to the defined minimum size N. The cache controller 115 also begins measuring, using one of the timers 126 (referred to as the "size timer"), the amount of time since the processor core 105 has exited the low-power state.

At time 502, the cache controller 115 determines that the size timer has reached a threshold value (expired). Accordingly, at time 503 the cache controller 115 increases the size of the L2 cache 114 to N+1 and resets the size timer. At time 504 the processor core 105 undergoes a context switch and begins executing a different program thread. Accordingly, the cache controller 115 suspends adjustment of the size timer and starts another timer (the "suspend timer") to measure the amount of time that the size timer has been adjusted. At time 505, the suspend timer expires and, in response, the cache controller 115 causes the size timer to resume timing. At time 506 the size timer expires. Accordingly, the cache controller 115 increases the size of the L2 cache 114 to N+2.

Figure 6:
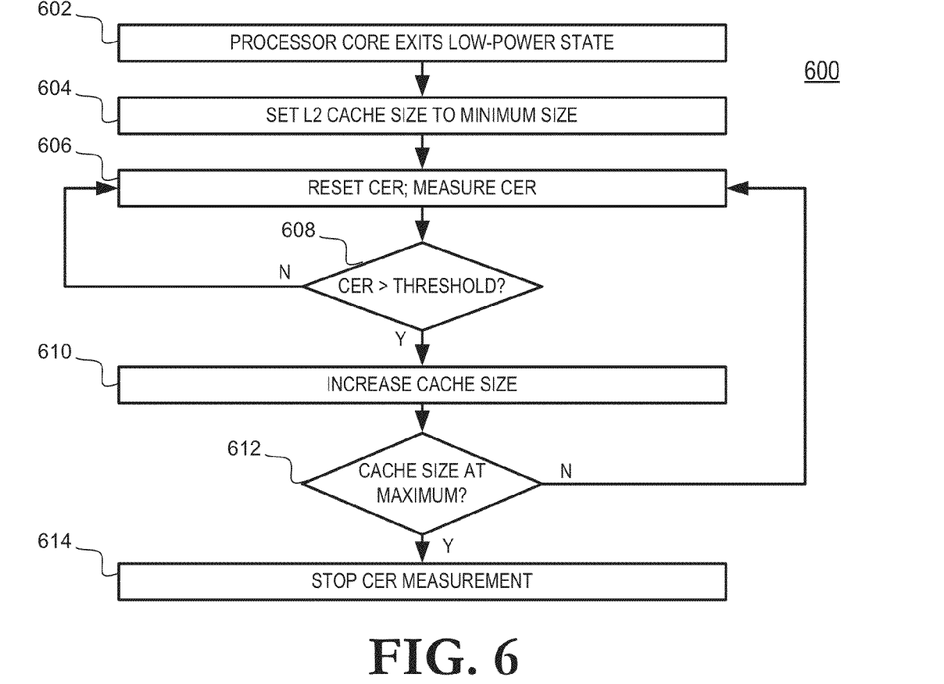
FIG. 6 is a flow diagram illustrating a method of adjusting the size of a shared cache based on a performance metric in accordance with some embodiments.

FIG. 6 illustrates a flow diagram of a method 600 of adjusting the size of a cache based on a performance metric in accordance with some embodiments. The method 600 is described with respect to an example implementation at the processing system 100 of FIG. 1, using CER as the performance metric. At block 602 the processor core 104 exits the low-power state. In response, at block 604 the cache controller 115 sets the size of the L2 cache 114 to a minimum size. At block 606 the cache controller 115 begins measuring the CER for the L2 cache 114. At block 608 the cache controller 115 determines whether the CER exceeds a programmable threshold. If not, the method flow returns to block 606. If the CER does exceed the programmable threshold, the method flow proceeds to block 610 and the cache controller 115 increases the size of the L2 cache 114. The method flow proceeds to block 612 and the cache controller 115 determines whether the size of the L2 cache 114 is set to its maximum value. This maximum value can be a programmable value, or can be the maximum number of ways that area available for each set of the L2 cache 114. If the size of the L2 cache 114 is not at its maximum value, the CER value is reset and the method flow returns to block 606 and the cache controller 115 again measures the CER for the L2 cache 114. If the size of the L2 cache 114 is at its maximum value, the method flow proceeds to block 614 and the cache controller 115 stops measuring the CER for the L2 cache 114.

Figure 7:
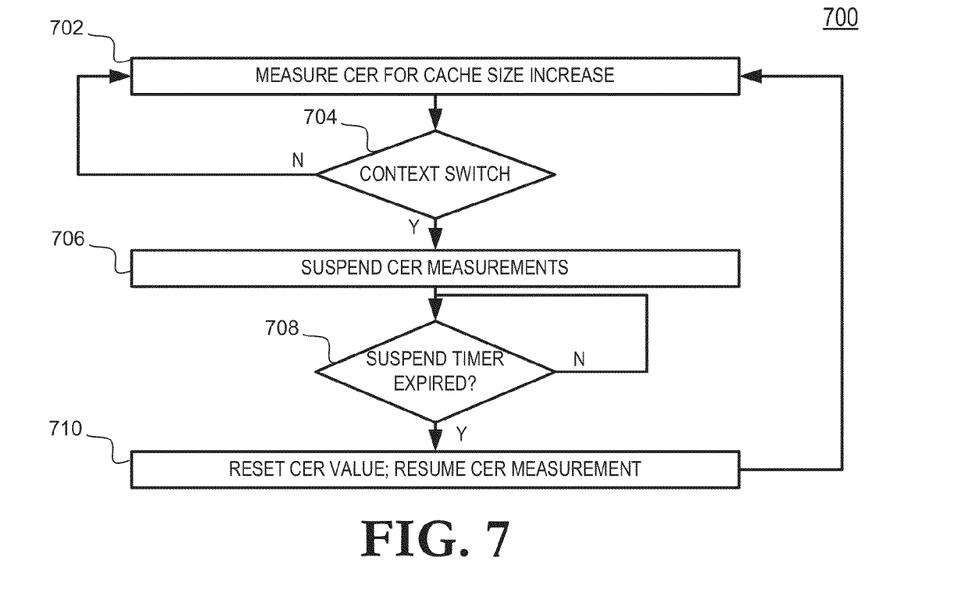
FIG. 7 is a flow diagram illustrating a method of adjusting the size of a shared cache based on a context switch in accordance with some embodiments.

FIG. 7 illustrates a flow diagram of a method 700 for suspending measurement of a performance metric so that a cache size is not increases in accordance with some embodiments. The method 700 is described with respect to an example implementation at the processing system 100 of FIG. 1, using CER as the performance metric. At block 702, the cache controller 115 measures the CER for the L2 cache 114 to determine whether to increase the size of the cache, as described above with respect to FIG. 6. At block 704 the cache controller 115 determines if it has received an indication of a context switch at the processor core 104. If not, the method flow returns to block 702 and the cache controller 115 continues to measure the CER for the L2 cache 114. In response to receiving an indication of a context switch at the processor core 104, the method flow moves to block 706 and the cache controller 115 suspends measurement of the CER for the L2 cache 114. In addition, the cache controller 115 initializes a timer (referred to as the suspend timer). At block 708, the cache controller 115 determines whether the suspend timer has expired. If not, the suspend timer continues being adjusted until it expires. In response to the suspend timer expiring, the method flow moves to block 710 and the cache controller 115 resets the CER and resumes measuring the CER for the L2 cache 114, for the purposes of determining whether to increase the size of the L2 cache 114.

Figure 8:
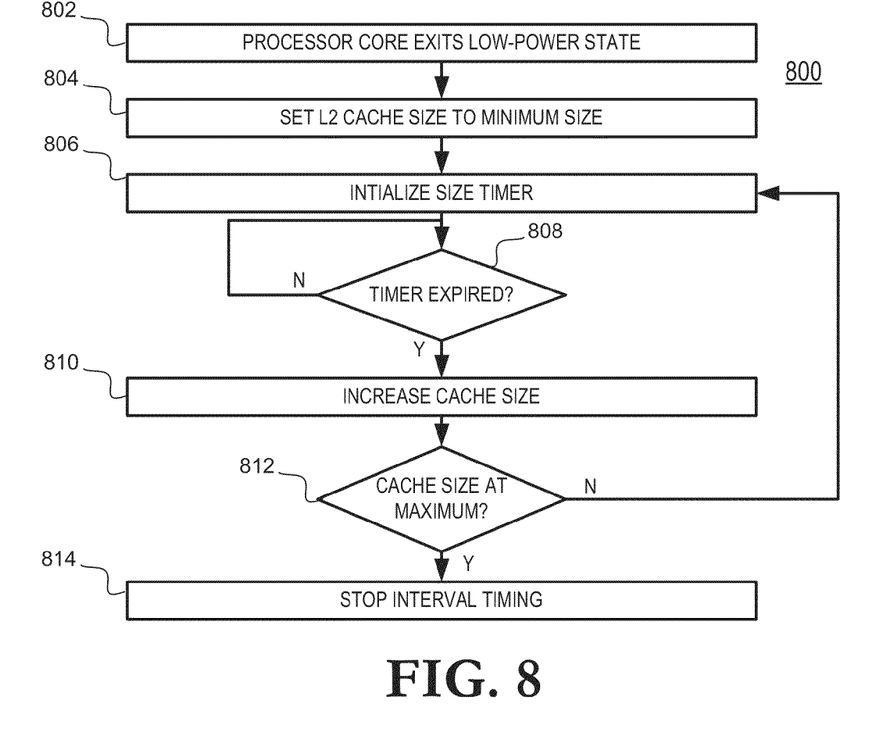
FIG. 8 is a flow diagram illustrating a method of adjusting the size of a shared cache based on time intervals in accordance with some embodiments.

FIG. 8 illustrates a flow diagram of a method 800 of periodically adjusting the size of a cache based on time intervals in accordance with some embodiments. The method 800 is described with respect to an example implementation at the processing system 100 of FIG. 1. At block 802, the processor core 104 exits a low-power state. In response, at block 804 the cache controller 115 sets the size of the L2 cache 114 to a minimum size. At block 806 the cache controller 115 initializes one of the timers 126, referred to as the size timer. At block 808 the cache controller 115 determines if the size timer has expired. If not, adjustment of the size timer continues until it expires. In response to the size timer expiring, the method flow moves to block 810 and the cache controller 115 increases the size of the L2 cache 114. At block 812 the cache controller 115 determines if the size of the L2 cache 114 is at its maximum value. If not, the method flow returns to block 806 and the cache controller 115 reinitializes the size timer to begin another time interval measurement. If, at block 812, the cache controller 115 determines that the size of the L2 cache 114 is at its maximum value, the method flow proceeds to block 814 and the cache controller 115 stops measuring the time intervals.

In some embodiments, the apparatus and techniques described above are implemented in a system comprising one or more integrated circuit (IC) devices (also referred to as integrated circuit packages or microchips), such as the processor described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
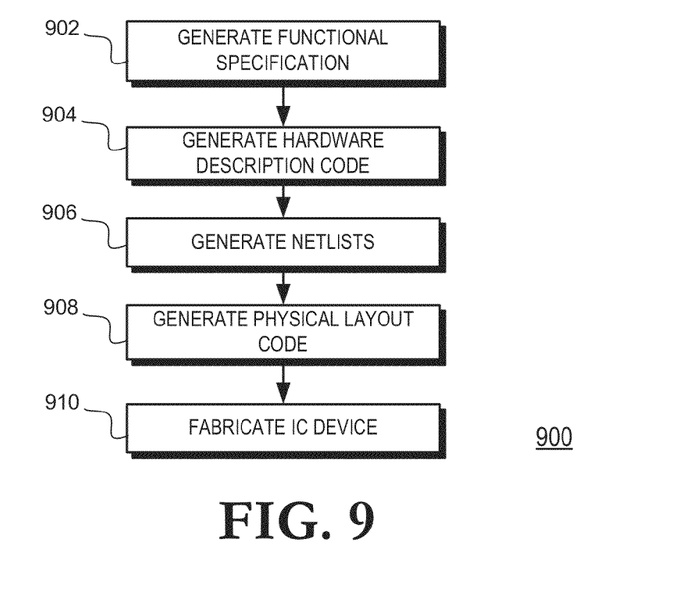
FIG. 9 is a flow diagram illustrating a method for designing and fabricating an integrated circuit device implementing at least a portion of a component of a processing system in accordance with some embodiments.

FIG. 9 is a flow diagram illustrating an example method 900 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method includes: adjusting a size of a cache based on a performance metric of a processor by changing a number of ways of the cache available to store data. In some aspects adjusting the size of the cache comprises: setting the size of the cache to a first size in response to a processor core of the processor exiting a low-power state; and adjusting the size of the cache from the first size to a second size based on the performance metric reaching a first threshold. In some aspects adjusting the size of the cache further comprises: adjusting the size of the cache from the second size to a third size based on the performance metric reaching a second threshold. In some aspects the performance metric comprises a number of cache lines evicted from the cache. In some aspects the performance metric comprises a rate at which cache lines are evicted from the cache. In some aspects the rate comprises a number of cache lines evicted from the cache per a number of microoperations committed at an instruction pipeline of the processor. In some aspects the method further includes suspending adjustment of the size of the cache in response to a context switch at the processor indicating a processor core has switched from executing a first thread to executing a second thread. In some aspects adjusting the size of the cache comprises adjusting the size of the cache based on a frequency of the processor exiting a low-power state. In some aspects the cache is shared between a first processor core and a second processor core.

In some embodiments, a method includes periodically adjusting a size of a cache at a processor in response to the processor exiting a low-power state. In some aspects the method further includes suspending adjustment of the size of the cache in response to a context switch at the processor indicating a processor core has switched from executing a first thread to executing a second thread. In some aspects periodically adjusting the size of the cache comprises periodically adjusting the size of the cache based on a frequency of the processor exiting the low-power state.

In some embodiments a processor includes: a processor core; a cache; a performance monitor to measure a performance metric based on execution of instructions at the processor core; and a cache controller to adjust a size the cache based on the performance metric by changing a number of ways of the cache available to store data. In some aspects the cache controller is to adjust the size of the cache by: setting the size of the cache to a first size in response to the processor core exiting a low-power state; and adjusting the size of the cache from the first size to a second size based on the performance metric reaching a first threshold. In some aspects the cache controller is to further adjust the size of the cache by: adjusting the size of the cache from the second size to a third size based on the performance metric reaching a second threshold. In some aspects the performance metric comprises a number of cache lines evicted from the cache. In some aspects the performance metric comprises a rate at which cache lines are evicted from the cache. In some aspects the rate comprises a number of cache lines evicted from the cache per a number of micro-operations committed at an instruction pipeline of the processor core. In some aspects the cache controller is to suspend adjustment of the size of the cache in response to a context switch at the processor indicating the processor core has switched from executing a first thread to executing a second thread. In some aspects the cache controller is to adjust the size of the cache based on a frequency of the processor core exiting a low-power state.

In some embodiments, a computer readable medium stores code to adapt at least one computer system to perform a portion of a process to fabricate at least part of a processor, the processor including: a processor core; a cache; a performance monitor to measure a performance metric based on execution of instructions at the processor core; and a cache controller to adjust a size the cache based on the performance metric by changing a number of ways of the cache available to store data. In some aspects the cache controller is to adjust the size of the cache by: setting the size of the cache to a first size in response to the processor core exiting a low-power state; and adjusting the size of the cache from the first size to a second size based on the performance metric reaching a first threshold. In some aspects the cache controller is to further adjust the size of the cache by: adjusting the size of the cache from the second size to a third size based on the performance metric reaching a second threshold. In some aspects the performance metric comprises a number of cache lines evicted from the cache. In some aspects the performance metric comprises a rate at which cache lines are evicted from the cache.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   adjusting by a processor a size of a cache based on a performance metric of the processor by changing a number of ways of the cache available to store data, wherein adjusting the size of the cache comprises:
   setting at the processor the size of the cache to a first size in response to a processor core of the processor exiting a low-power state; and
   adjusting at the processor the size of the cache from the first size to a second size based on the performance metric reaching a first threshold.

2. The method of claim 1, wherein adjusting the size of the cache further comprises:
   adjusting the size of the cache from the second size to a third size based on the performance metric reaching a second threshold.

3. The method of claim 1, wherein the performance metric comprises a number of cache lines evicted from the cache.

4. The method of claim 1, wherein the performance metric comprises a rate at which cache lines are evicted from the cache.

5. The method of claim 4, wherein the rate comprises a number of cache lines evicted from the cache per a number of micro-operations committed at an instruction pipeline of the processor.

6. The method of claim 1, further comprising suspending adjustment of the size of the cache in response to a context switch at the processor indicating a processor core has switched from executing a first thread to executing a second thread.

7. The method of claim 1, wherein the cache is shared between a first processor core and a second processor core.

8. A method, comprising:
   identifying by a processor a frequency of the processor exiting a low-power state; and
   periodically adjusting a size of a cache at the processor based on the frequency of the processor exiting the low-power state.

9. The method of claim 8, further comprising suspending adjustment of the size of the cache in response to a context switch at the processor indicating a processor core has switched from executing a first thread to executing a second thread.

10. A processor, comprising:
    a processor core;
    a cache;
    a performance monitor to measure a performance metric based on execution of instructions at the processor core; and
    a cache controller to adjust a size the cache based on the performance metric by changing a number of ways of the cache available to store data, wherein the cache controller is to adjust the size of the cache by:
    setting the size of cache to a first size in response to the processor core exiting a low-power state; and
    adjusting the size of the cache from the first size to a second size based on the preformance metric reaching a first threshold.

11. The processor of claim 10, wherein the cache controller is to further adjust the size of the cache by:
    adjusting the size of the cache from the second size to a third size based on the performance metric reaching a second threshold.

12. The processor of claim 10, wherein the performance metric comprises a number of cache lines evicted from the cache.

13. The processor of claim 10, wherein the performance metric comprises a rate at which cache lines are evicted from the cache.

14. The processor of claim 13, wherein the rate comprises a number of cache lines evicted from the cache per a number of micro-operations committed at an instruction pipeline of the processor core.

15. The processor of claim 10, wherein the cache controller is to suspend adjustment of the size of the cache in response to a context switch at the processor indicating the processor core has switched from executing a first thread to executing a second thread.

16. A non-transitory computer readable medium storing code to adapt at least one computer system to perform a portion of a process to fabricate at least part of a processor, the processor comprising:
  a processor core;
  a cache;
  a performance monitor to measure a performance metric based on execution of instructions at the processor core; and
  a cache controller to adjust a size the cache based on the performance metric by changing a number of ways of the cache available to store data, wherein the cache controller is to adjust the size of the cache by:
    setting the size of the cache to a first size in response to the processor core exiting a low-power state; and
    adjusting the size of the cache from the first size to a second size based on the performance metric reaching a first threshold.

17. The computer readable medium of claim 16, wherein the cache controller is to further adjust the size of the cache by:
  adjusting the size of the cache from the second size to a third size based on the performance metric reaching a second threshold.

18. The computer readable medium of claim 16, wherein the performance metric comprises a number of cache lines evicted from the cache.

19. The computer readable medium of claim 16, wherein the performance metric comprises a rate at which cache lines are evicted from the cache.

* * * * *